US006259184B1

(12) United States Patent
Bender

(10) Patent No.: US 6,259,184 B1
(45) Date of Patent: Jul. 10, 2001

(54) LOAD SHIFTING DEVICE

(75) Inventor: Günther Bender, Rodheim (DE)

(73) Assignee: Mannesmann VDO AG, Frankfurt (DE)

( * ) Notice: Subject to any disclaimer, the term of this patent is extended or adjusted under 35 U.S.C. 154(b) by 0 days.

(21) Appl. No.: 09/284,777

(22) PCT Filed: Oct. 9, 1997

(86) PCT No.: PCT/EP97/05560

§ 371 Date: Apr. 16, 1999

§ 102(e) Date: Apr. 16, 1999

(87) PCT Pub. No.: WO98/17905

PCT Pub. Date: Apr. 30, 1998

(30) Foreign Application Priority Data

Oct. 24, 1996 (DE) .............................................. 196 44 169

(51) Int. Cl.[7] .......................... H02K 11/00; H01R 37/38; H01R 39/36; H01F 27/29; F16K 31/02

(52) U.S. Cl. ............................ 310/239; 310/249; 310/71; 336/192; 251/129.11

(58) Field of Search ..................................... 310/238, 239, 310/242, 245, 246, 249, 71; 191/2; 336/107, 192; 439/130; 123/188.1, 399; 251/129.11

(56) References Cited

U.S. PATENT DOCUMENTS 4,398,135 * 8/1983 Busch et al. ......................... 318/443
4,601,271 * 7/1986 Ejiri et al. ........................... 123/361
4,688,420 * 8/1987 Minagawa ........................... 73/118.1
4,727,274 * 2/1988 Adam et al. ......................... 310/239
4,926,075 * 5/1990 Fushiya et al. ........................ 310/50
5,148,073 * 9/1992 Tamura ............................... 310/239
5,440,186 * 8/1995 Forsell et al. ........................ 310/239
5,460,035 * 10/1995 Pfaffenberger ...................... 73/118.1
5,528,093 * 6/1996 Adam et al. .......................... 310/89
5,868,114 * 2/1999 Kamimura et al. .................. 123/399

FOREIGN PATENT DOCUMENTS 3405935 8/1985 (DE) .
3815735 11/1989 (DE) .
4100381 7/1992 (DE) .
0596392 5/1994 (EP) .
9618028 6/1996 (WO) .
9716638 5/1997 (WO) .

* cited by examiner

*Primary Examiner*—Nestor Ramirez
*Assistant Examiner*—Dang Dinh Le
(74) *Attorney, Agent, or Firm*—Martin A. Farber

(57) ABSTRACT

Load adjusting device having an actuating device, in particular an electric motor, which, in a throttle valve housing (18) having an electrical connection, adjusts a throttle valve of an internal combustion engine, wherein, a mounting plate (1) having electrically conductive regions is inserted in the throttle valve housing (18), and the electrical connection is connected at least to the actuating device via the electrically conductive regions of the mounting plate (1).

5 Claims, 3 Drawing Sheets

LOAD SHIFTING DEVICE

FIELD AND BACKGROUND OF THE INVENTION

The invention relates to a load adjusting device having a throttle valve, arranged in a throttle valve housing, for controlling the power of an internal combustion engine.

DE 38 15 735 A1 discloses a load adjusting device, in which a throttle valve is mounted in a throttle valve housing such that it can rotate. The throttle valve is adjusted as a function of parameters which can be predetermined by an actuating device, in particular an electric motor, in order to control the power of the internal combustion engine. The throttle valve housing contains, in each case separately, a throttle valve potentiometer with its own wiring as well as the electric motor with its own wiring, which must be passed individually out of the throttle valve housing.

This arrangement has the disadvantage that the large number of components means that the assembly complexity is considerable and, owing to the use of wiring, there is a risk of wires breaking.

SUMMARY OF THE INVENTION

The invention is thus based on the object of refining a load adjusting device of the type mentioned initially, in such a manner that, while retaining the compact construction, the assembly complexity is simplified and the risk of wires breaking is avoided.

According to the invention a mounting plate (1) having electrically conductive regions is inserted in the throttle valve housing (18), and the electrical connection is connected at least to the actuating device via the electrically conductive regions of the mounting plate (1).

The use of a mounting plate having electrically conductive regions has the advantage that the wiring can be omitted, particularly if the electrically conductive regions are connected to the electrical connection (plug). It is also advantageous that, during the assembly of the load adjusting device, the mounting plate just needs to be inserted into the throttle valve housing, so that there is no need for any further actions such as laying wires, soldering or the like. This is particularly advantageous, in particular in large-scale production of load adjusting devices, since this results in a considerable time advantage during production.

In a development of the invention, the actuating device, which is designed as an electric motor, has, in a manner known per se, carbon brushes which are loaded by means of springs and are connected to a commutator of the electric motor, and at least the carbon brushes and the springs are arranged on and/or in the mounting plate. This has the advantage that elements of the electric motor can also be preinstalled in the mounting plate at this stage, so that there is no wiring for the electric motor, either. Furthermore, it is advantageous that different electric motors can be used with one preconfigured mounting plate.

In a development of the invention, the mounting plate accommodates suppression means such as suppression inductors, suppression capacitors or the like, for the actuating device. Once again, the suppression means do not need to be fitted separately on the electric motor, since the mounting plate is arranged in the immediate vicinity of the electric motor, and suppression means which are arranged in the mounting plate thus have an optimum effect.

In a development of the invention, the mounting plate has a plug or a socket as the electrical connection, and the plug and/or the socket are designed in one or more parts, in particular in two parts. In this case, the plug or the socket can form a unit with the mounting plate, which is particularly advantageous during the production of the mounting plate, or else can be designed as a separate component, which then has the advantage that different types of plugs or sockets which may have different shapes, for example depending on the respective manufacturer, and can be attached to the mounting plate, for example by means of screw connections, bonding or the like. To this end, the invention advantageously provides that one part of the multi-part plug or of the multi-part socket can be connected to the mounting plate.

In a development of the invention, a seal is provided between the plug or the socket and/or between the parts of the plug or of the socket and the throttle valve housing. This has the advantage that the region in which the plug or the socket is passed out of the throttle valve housing is reliably sealed against environmental influences (in particular moisture and dust).

In a development of the invention, a plurality of track regions of a throttle-valve potentiometer for detecting the position of the throttle valve are arranged on the mounting plate, the mounting plate extends around a region of a throttle valve shaft, and the plurality of track regions are arranged concentrically around the throttle valve shaft. This has the advantage that, when the mounting plate is inserted into the throttle valve housing, a major proportion, namely the plurality of track regions (conductor and resistor regions) of the throttle valve potentiometer is available, and only the wiper pick-up still needs to be fitted. Since the plurality of track regions are likewise routed to the electrical connection via electrically conductive regions in the mounting plate, there is once again no need for any corresponding wiring in this case. Furthermore, it is feasible for the mounting plate to include switches or the like, for example for defining a throttle valve idle position.

In a development of the invention, a bleed resistor is connected between the throttle valve housing and a connection, particularly an electrical connection which is connected to the carbon brush of the electric motor. This bleed resistor is particularly advantageous if the induction manifold is made of plastic, in which case there is a risk of static charge building up on the throttle valve housing. The bleed resistor is arranged on or in the mounting plate and may be connected, for example by a clamped connection, to the throttle valve housing.

In a development of the invention, the electrically conductive regions of the mounting plate are designed as conductor tracks arranged on the mounting plate. The conductor tracks may be produced, for example, by etching away that part which is not required of the total electrically conductive regions on the mounting plate.

In a development of the invention, the mounting plate is designed with a plurality of layers, and the electrically conductive regions are inserted between an electrically non-conductive upper layer and lower layer. This is particularly advantageous when, for example, high currents flow to the electric motor, for which the conductor tracks would not have been designed.

In a development of the invention, the mounting plate is designed in a number of parts and an electrical contact between the respective electrically conductive regions is provided in the connecting region, in particular of the ends of the plurality of mounting plate parts. A plurality of mounting plate parts can thus be assembled in an advantageous manner in a type of building-block system, and may differ in terms of geometric extent or other specifications. Thus, for example, it is advantageous for a base mounting plate to be used which, on the one hand, accommodates the electrical connection and the springs of the electric motor and, on the other hand, a supplementary mounting plate can be connected to it, which has the plurality of track regions for the throttle valve potentiometer. The plurality of mounting plate parts may, for example, have holes in which pins on the throttle valve housing engage after assembly, and fix the mounting plate parts in their position.

In a development of the invention, the mounting plate or the plurality of mounting plate parts can be fixed by the throttle valve housing or a cover which closes the throttle valve housing, or some other cover. This represents a further simplification of the assembly process, since, essentially, only the actuating device (in particular the electric motor including any transmission that there may be), the mounting plate or the mounting plate parts and, possibly, the wiper pick-up need now be fitted in the throttle valve housing, and they are then fixed in their position by the cover.

The invention permits a wide range of embodiments, in particular with respect to the geometric shape of the mounting plate, and one preferred embodiment is described in the following text and is explained with reference to the figures, without the invention being limited to this embodiment.

BRIEF DESCRIPTION OF THE DRAWINGS

With the above and other objects in view, the invention will be understood from the accompanying description of a preferred embodiment when considered with the accompanying drawings, of which

DETAILED DESCRIPTION OF THE PREFERRED EMBODIMENT

Figure 1:
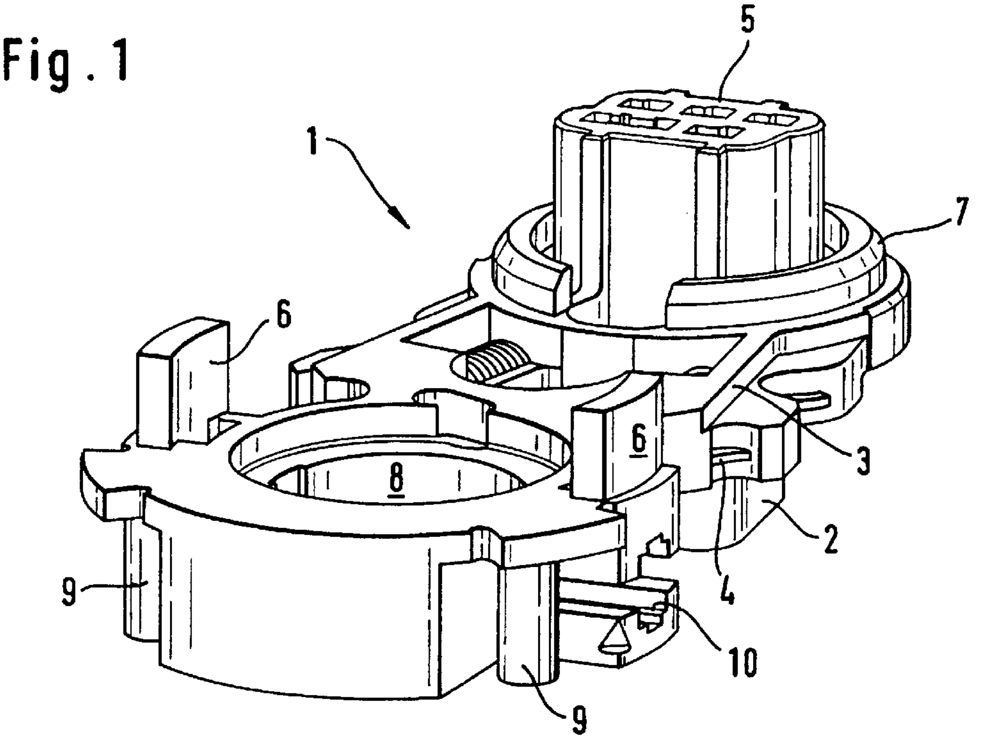
FIGS. 1 to 3 show various side views of a mounting plate.
Figure 2:
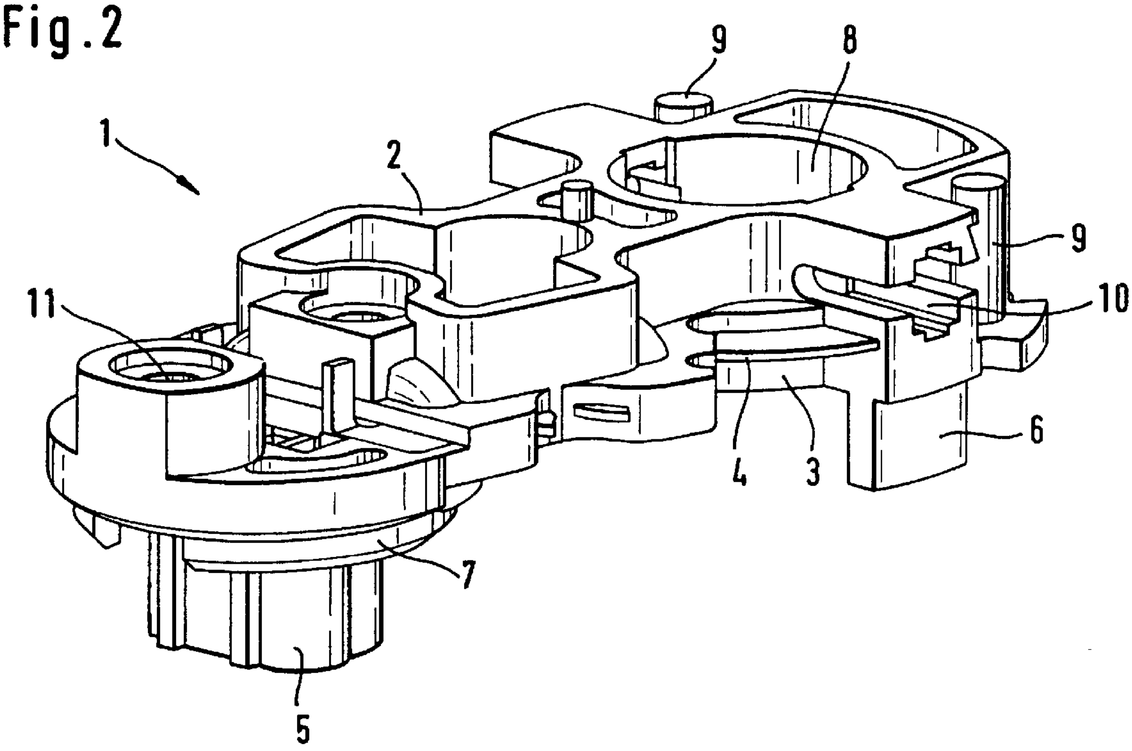
Figure 3:
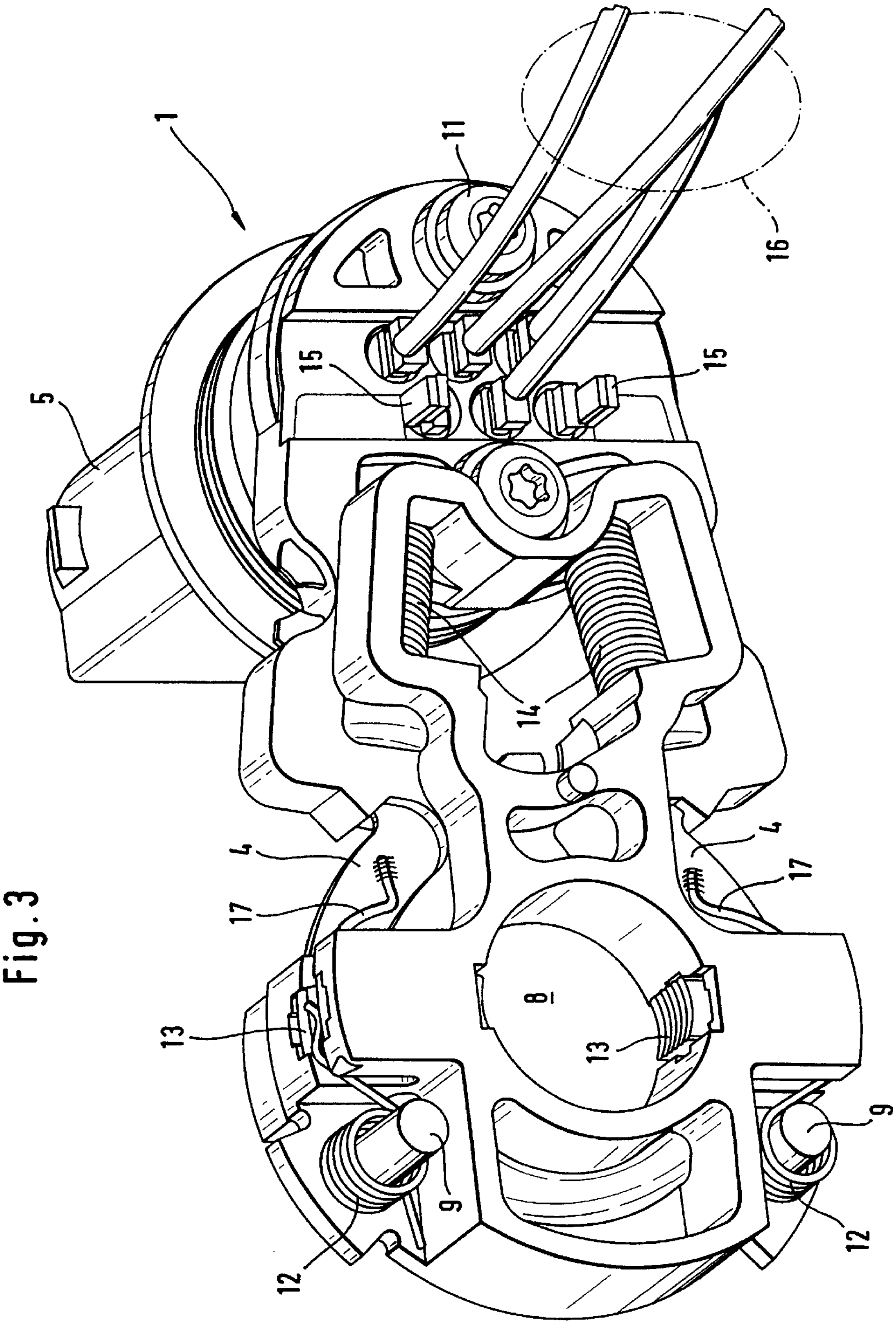

FIGS. 1 to 3 show various views of a mounting plate 1 which can be inserted into a throttle valve housing of a throttle valve connecting stub, and identical components have been given the same reference numbers. In the simplest configuration, the mounting plate 1 is designed as a flat plate, but it may also have complex geometric contours, as is shown, for example, in FIGS. 1 to 3. In FIG. 1, the mounting plate 1 is composed of a first layer 2 and a second layer 3, with a plurality of insert metal sheets 4, which are insulated from one another and represent the electrically conductive region, being inserted between these two layers 2 and 3. The two layers 2 can be connected to one another by means of appropriate measures such as bonding, but it is also feasible for the mounting plate 1 to be cast integrally, subject to insertion of the electrically conductive regions. In a basic version, a plug 5 is attached to the mounting plate 1 or is cast on it, and may be supplemented by other plug or socket parts, such as sleeves. Furthermore, there are fixing regions 6 and 7 in the form of webs on the mounting plate 1 (cast on), by means of which the mounting plate 1 is fixed in position and, if required, is arranged at a distance in the throttle valve housing. In one end region of the mounting plate 1, which is preferably of elongated design, there is an opening 8 through which at least the commutator of the electric motor (which is not shown in FIGS. 1 to 3) can be inserted or can be passed. Pins and insertion openings 10, which will be described later, are provided to accommodate and secure the carbon brushes of the electric motor.

In addition, FIG. 2 also shows an attachment hole 11, using which the mounting plate 1 is fixed in position, for example by means of at least one screw, and is connected to the throttle valve housing so that there is no rattling.

As a supplement to the embodiment shown in FIGS. 1 and 2, FIG. 3 shows springs 12 which are mounted around the pins 9, are supported at one end on one surface of the mounting plate 1 and whose spring force acts at the other end on carbon brushes 13 of the electric motor (which is not shown), in which case the commutator of the electric motor, via which and the carbon brushes 13 the electric motor is supplied with a voltage, is mounted in the opening 8 such that it can rotate. Furthermore, suppression inductors 14 are shown, via which the electric motor is electrically connected to motor contacts 15, which are arranged in the plug 5. In the case of a DC motor, two motor contacts 15 are normally sufficient, although a greater number is also conceivable, especially if stepping motors are used. FIG. 3 shows a cable harness 16 having a plurality of cables that is arranged on further contacts of the plug 5, which cable harness 16, in this embodiment, leads to a throttle valve potentiometer, which is not shown. Alternatively, according to the invention, it is possible to provide for the cables in the cable harness 16 to be arranged as rigid, electrically conductive regions in or on the mounting plate 1, and for the mounting plate 1 likewise to accommodate the throttle valve potentiometer in a physical unit or as an external part. Apart from this, the figure also shows that the carbon brushes 13 are connected to the electrically conductive region (insert metal sheet 4) via a connecting braid 17.

Figure 4:
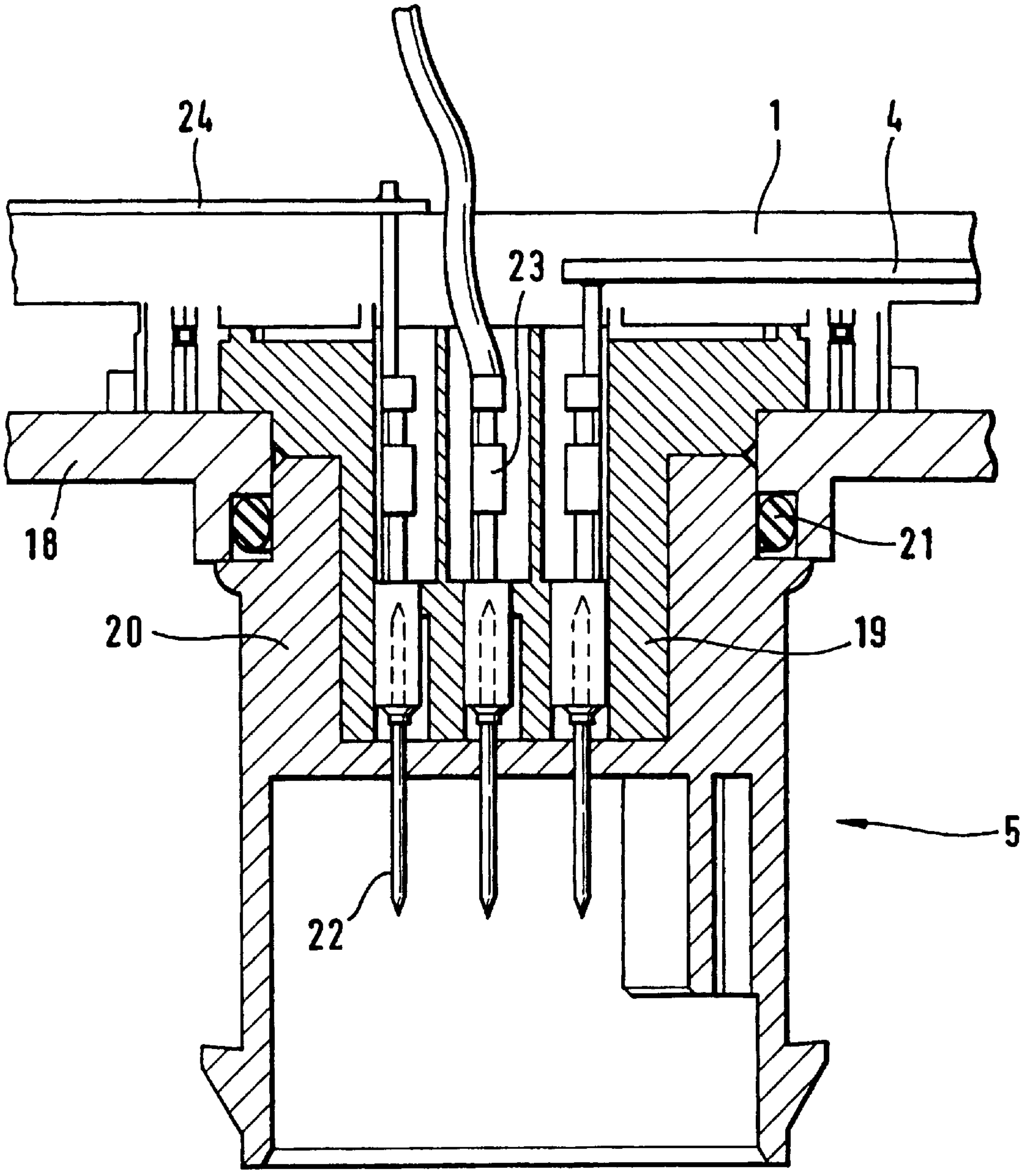
FIG. 4 shows the construction of a multi-part plug.

FIG. 4 shows an electrical connection in the form of a plug 5, although the electrical connection can, of course, also be designed as a socket. In this FIG. 4, the reference number 18 shows the partially illustrated housing of the throttle valve connecting stub, in which the mounting plate 1 is inserted. The illustrated plug 5 has a first part 19, which is either arranged on the mounting plate 1 or forms a physical unit with the mounting plate 1 (for example being cast on it). The second part 20 of the plug 5 is advantageously located above the first part 19, with a circumferential seal 21 arranged in between, and with the second part 20 of the plug 5 advantageously being matched to the requirements of the motor vehicle manufacturer in which the load adjusting device is installed. A plurality of contact pins 22 are passed out of the first part 19 in a sealed manner, and are surrounded by the second part 20, which protects them. A socket contact 23 is provided on the region of the contact pins 22 facing the mounting plate 1 and is either connected to the insert metal sheet 4 (the right-hand contact pin 22 when looking at FIG. 4), is connected to a cable in the cable harness 16 (the center contact pin 22 when looking at FIG. 4), or is soldered to a conductor track 24 located on the top of the mounting plate 1 (the left-hand contact pin 22 when looking at FIG. 4). Depending on the configuration of the mounting plate 1, only one of the said contact means or else a combination of them is possible.

What is claimed is:

1. A load adjusting device having a throttle valve which is arranged in a throttle valve housing the latter having an electrical connection, the throttle valve being drivable by an actuating device, in particular an electric motor, to adjust power of an internal combustion engine, wherein a mounting plate having electrically conductive regions is inserted in the throttle valve housing, and the electrical connection is connected at least to the actuating device via the electrically conductive regions of the mounting plate; and wherein the electrical connection extends transversely of the mounting plate, the mounting plate comprises a layer of electrically non-conductive material, the electrically conductive regions extend along and in contact with said layer to connect with pins of said electrical connection;

the actuating device which is an electric motor having brushes which are connected to a commutator of the electric motor; and the mounting plate includes a passage, extending transversely of the mounting plate, for receiving said commutator and enabling the mounting plate to hold said brushes in registration with said commutator.

2. A load adjusting device according to claim 1 wherein said brushes are spring loaded, and the mounting plate holds springs for urging said brushes toward said commutator.

3. A load adjusting device according to claim 2 wherein a base region of the mounting plate, between said electrical connection and said passage, is configured for receiving electrical noise suppression inductors for suppression of noise from said motor.

4. The load adjusting device as claimed in claim 1, wherein a plurality of track regions of a throttle valve potentiometer for detecting position of the throttle valve are arranged on the mounting plate, the mounting plate extends around a region of a throttle valve shaft, and the plurality of track regions are arranged concentrically around the throttle valve shaft.

5. The load adjusting device as claimed in claim 1, further comprising a bleed resistor, and wherein said bleed resistor is connected between the throttle valve housing and an electrical connection of a brush of the electric motor.

* * * * *